United States Patent Office 3,097,947
Patented July 16, 1963

3,097,947
NUTRITIONAL COMPOSITION AND PROCESS
Kenneth Stanley Kemmerer, Evansville, Ind., assignor to Mead Johnson & Company, Evansville, Ind., a corporation of Indiana
No Drawing. Filed Jan. 30, 1961, Ser. No. 85,456
40 Claims. (Cl. 99—63)

This invention relates to improvements in nutritional compositions and more particularly relates to dietary nutritional compositions useful in the administration of diets of predetermined caloric intake adapted to weight control regimens. It further relates to a novel process for the preparation of preferred forms of the present composition. This application is a continuation-in-part of my prior copending patent application Serial No. 52,058, filed August 26, 1960, now abandoned.

Numerous attempts have been made to provide a dietary nutritional product which would be useful in the control of weight and yet provide for all known nutritional requirements and maintain satiety. The present compositions are preferred for weight-reducing regimens, but are also adapted for dietary supplementation to fortify debilitated or underweight subjects.

To reduce the weight of obese persons, a limited caloric intake is nearly always essential. However, it is necessary to provide not only for the limitation of caloric intake but also for adequate nutrition to maintain health. For example, it is well known that individuals consuming a limited or narrow diet may develop vitamin deficiencies. Furthermore, if only carbohydrates are ingested for an extended period, even if in minimal amounts, protein deficiency will ensue. Lack of unsaturated fats in the diet may result in the dermatological changes or dry scaling of the skin that follows fat deprivation in experimental animals.

A dietary nutritional product for weight-reducing purposes must have a high satiety value to eliminate as much as possible the temptation to overeat.

Likewise it is necessary that a dietary product be palatable. For example, it is well known that soybean flour or meal provides a high protein food; however, products containing more than about 25% soybean flour are unpalatable.

Accordingly it is an object of the present invention to provide a dietary nutritional composition useful in weight control of humans which will satisfy all nutritional and health requirements at a low caloric intake.

It is a further object to provide a nutritional product with a proper balance of carbohydrates, fats and proteins to prevent nutritional deficiencies.

It is a still further object to provide a nutritional product which, when consumed in the prescribed amounts, will provide all minimum vitamin and mineral requirements.

A still further object is the provision of a nutritional composition that has a high satiety value.

A still further object is the provision of a nutritional product that has a nutritionally proper balance of unsaturated and saturated fats.

A still further object is the provision of a nutritional product that is palatable to humans.

A still further object is the provision of a nutritional product which is readily measured so as to provide a known caloric content of a nutritionally adequate food.

A still further object is to provide a nutritional product which has a low sodium content.

A still further object is the provision of a nutritional product which is adapted for preparation and consumption in a variety of forms.

A still further object is the provision of an economical and reproducible process for the production of the present compositions which is adapted to commercial use.

These and other objects of the present invention will be apparent from the following specification and appended claims.

Accordingly, in one broad form the present invention relates to a vitamin and mineral fortified dietary nutritional composition comprising milk solids containing from 52% to 81% nonfat milk solids and from 1% to 4% milk fat, from 6% to 18% soy flour and from 4% to 12 sugar. In the most preferred form the compositions comprise milk solids containing from 58% to 75% nonfat milk solids and from 1.5% to 2.5% milk fat, from 9% to 13% soy flour and from 5% to 9% sugar. Broadly the total milk solids including nonfat milk solids and milk fat is from 53% to 85% and preferably from 59% to 78%. The term sugar, as used herein, includes sugars, preferably selected from the group consisting of sucrose, fructose, maltose and dextrose, of which the most preferred is sucrose. The above proportions are on a dry weight basis.

The compositions of the invention may be further characterized as containing from 25% to 35% protein, preferably from 29% to 33% protein, from 5% to 13% fat, preferably from 8% to 10% fat, and from 40% to 60% carbohydrate, all on a dry weight basis. The fat component of these compositions is preferably divided in proportions of from 50% to 70% unsaturated fats and from 30% to 50% saturated fat.

The compositions of the present invention may also be defined in terms of milk solids content as containing from 50% to 75% nonfat milk solids, preferably from 55% to 70% nonfat milk solids, and from 3% to 10% whole milk solids, preferably from 4% to 8% whole milk solids.

The soy (soybean) flour, as indicated, is preferably one that has been pre-cooked or treated in accordance with the process of the present invention to improve the digestibility and palatability thereof, and to provide for ready dispersibility. When low fat, or defatted soy flours are employed, other sources of edible fats or oils are added to adjust the composition of the product to within the specified range of fat content.

Generally the products of the present invention may be prepared in dry form which may be subsequently mixed with water to make a liquid dispersion. The products may be flavored with a variety of well-known flavors, such as chocolate, butterscotch, vanilla or the like. It is also contemplated that the present compositions may be prepared in the liquid form; however the various components are present in the stated proportions on a dry weight basis.

It is also possible to utilize the compositions of the present invention in the preparation of puddings or pudding mixes by the addition of gelatin or gelatinizing agents to the dry components of the composition which may then be gelatinized to pudding in the conventional manner.

The total caloric content of the powder-form composition of the present invention ranges from about 700 to 1200 calories per 227 grams (½ pound) and preferably from about 800 to 1000 calories on the same basis. The liquid composition contains from about 175 to 300 calories in each 8 fluid ounce portion.

The sodium content of the present compositions preferably is from about 0.3% to about 0.5% on a dry weight basis.

The products of this invention are vitamin and mineral fortified to the extent that ½ pound of the dried material provides adequate vitamins and minerals to satisfy the daily minimum requirements recommended by the Food and Nutrition Board of the National Research Council, publication 589, revised 1958, "Recommended Dietary Allowances."

One aspect of this invention resides in a process for treating the soybean flour which is used in the compositions of this invention. The process which is preferably employed to pre-treat the soy flour involves heating an aqueous suspension of the soy flour at slightly alkaline pH values until undesirable flavor bodies are removed and the physical structure of the flour is altered sufficiently to provide a product of improved nutritional quality and suspendibility and resuspendibility characteristics. It has been found that soy flour of usual commercial grade, including the full fat, low fat, and defatted varieties, is markedly improved with regard to the above indicated characteristics when subjected to the present process.

For instance, it has been found that a 5% suspension of commercial soy flour in water will undergo complete phase separation in two to three minutes after agitating the flour with the water despite its fine particle size. The particle size of commercial soy flour is ordinarily such as to permit passage through a 100 mesh sieve. Soy flour treated according to one embodiment of the present invention, however, provides a 5% suspension in water, which is stable for one to two hours or more. As to the organoleptic qualities, liquid nutritional compositions of the type disclosed in this application containing untreated commercial grade soy flour frequently have a beany flavor and a mealy or sandy-mouth feel. Soy flour treated according to the present invention appears to lose these characteristics and, therefore, to make possible preparation of superior nutritional products of the type herein contemplated.

Soy flour treated according to the present invention has further advantages in the preparation of liquid nutritional products. Aqueous suspensions of it have surprisingly been found to be entirely compatible with skim milk, permitting heat sterilization to be employed in the preparation of liquid nutritional products containing these ingredients. Curdling of the milk proteins has presented a long-standing problem in the preparation of liquid nutritional products containing both soy flour and milk solids as principal protein ingredients. This curdling effect on heat-sterilizing liquid products containing untreated or improperly treated soy flour and skim milk involves coagulation of the proteins resulting in their precipitation as aggregates varying from very fine particles having a grainy nature to marble-sized curds.

The soy flour pre-cooking process in accordance with one embodiment of this invention is accomplished essentially as follows: First, an aqueous slurry is prepared by mixing one part by weight of the soy flour with from 3 to 7.5 parts by weight of water. Precise measurement of the water within this range is not entirely necessary, but it is preferred in the interest of economy and convenient operation on a large scale. If less than 3 parts by weight of water are employed, a very viscous adhesive mass is obtained which is difficult to process, while the use of more than 7.5 parts by weight of water is uneconomical since distillation of excess water at a later stage in the process is usually required.

After formation of a homogeneous slurry, the alkalinity of the mass is adjusted to within the range pH 7.5 to 10. It is preferred to use a volatile base, such as ammonia, ammonium hydroxide, or a lower aliphatic amine having a boiling point of up to about 80° C., for pH adjustment, since it is readily removed by evaporation when no longer needed at a subsequent stage. Examples of operable amines include methylamine, ethylamine, ethanolamine, diethylamine, propylamine, trimethylamine, etc. Sodium hydroxide and other alkali metal, or alkaline earth metal oxides and hydroxides are also operable. However, since one of the objects of the present invention is to prepare a composition of low sodium content, use of sodium hydroxide is undesirable for pH adjustment.

The slightly alkaline suspension is then heated with agitation for a graded time interval at from 190° to 240° F. At 240° F. the desired alteration of the physical character of the flour takes place almost instantaneously. Heating periods varying from two or three seconds up to four minutes have been found to be operable at 240° F. At 190° F. ten to twenty minutes are required to bring about the desired modification of the flour. For intermediate temperatures within this range, time intervals gauged proportionately between 2 seconds and 20 minutes are employed. If treatment is extended beyond the above limits of time and temperature, undesirable flavors are developed making the flour unsatisfactory for use in the present compositions.

Coupled with this heat treatment is a distillation or evaporation feature. This results in removal of undesirable flavor bodies from the uncooked flour. Although it is possible to satisfactorily improve the flavor of the soy flour by vacuum distillation of aqueous slurries thereof at temperatures below the 190° F. heat treatment limit specified, the desirable alteration of the physical structure of the flour does not then take place. A convenient gauge for adjusting distillation or evaporation conditions to a particular apparatus is to condense the vapors evolved and to measure the amount of condensate. It has been found that when an amount of condensate is removed corresponding to about 1% the weight of the water charged to preparation of the original soy flour suspension, that sufficient evaporation has occurred to result in removal of the undesired flavors. Once the distillation or evaporation conditions have been empirically determined in this fashion, of course, it is not necessary to condense the vapors in subsequent routine operation.

The process may be conducted in any convenient equipment, so long as the above conditions are met. It has been found most convenient, however, to employ a continuous process in which the aqueous slurry is rapidly heated, for instance by direct steam injection, to a temperature of 190° F. to 240° F., to then pass the flow of liquid through an insulated or heated tube of sufficient length to maintain this temperature for approximately 10 seconds, and to then allow the liquid flow to pass into an evacuated tank in which the vacuum is adjusted so as to result in nearly instantaneous evaporation of the desired quantity of water. In operating on a heat cycle of 230° F. with a 24 inch vacuum, sufficient water to accomplish the above result is evaporated in the resulting flashing process to reduce the temperature of the liquid to within the range 120° F. to 135° F.

Alternatively in batch-type operation, the aqueous suspension may be agitated and heated in a tank by any desirable means at a temperature of from 190° F. up to the boiling point of the suspension at atmospheric pressure if an efficient condenser or ventilation system is provided so as to result in evaporation of an amount of water corresponding to at least 1% by weight of the water originally charged within the heating period prescribed. The mixture is then passed to further processing.

It has been found convenient in the preparation of preferred compositions of the present invention to include various other of the ingredients in the slightly alkaline aqueous slurry prior to the heat treatment step. For example, the major fatty glyceride ingredients and at least some of the milk solids are desirably incorporated at this stage. Emulsion stabilizers, mineral additives, etc., may also be added as components of the soy flour base prepared by the present process. Additional fatty glyceride ingredients amounting up to about 40 to 50% by weight of the process mixture may be incorporated prior to the aqueous heat treatment step without interfering with alteration of the soy flour in the desired fashion.

The further process steps required are determined by the nature of the desired finished composition. In the preparation of solid nutritional compositions, the soy flour suspension containing additional ingredients as mentioned, is simply spray dried. If the capacity of the drier is sufficient, the hot liquid from the heat treatment process described above may be passed directly to the drier without intermediate cooling. However, it is important that the extent of heat treatment be limited as described so as not to result in overcooking the flour resulting in the development of undesirable flavors. Therefore, if the mixture cannot be immediately dried, it should be cooled to a temperature of 160° F. or less. For storage for short periods of time, 160° F. is a convenient temperature, since a minimum of coolant is required, and sterility is readily maintained.

In the preparation of liquid nutritional products of the present invention, the liquid soy suspension after heat treatment and evaporation may be used directly after appropriate pH adjustment. Skim milk is frequently an important ingredient of such compositions. In the preparation of liquid nutritional products containing soy flour and skim milk or milk solids as significant protein ingredients, the consistency of the final product is affected by the pH thereof. Values less than about pH 6, of course, are unsuitable because the milk proteins coagulate and precipitate similar to the phenomenon observed when fresh milk sours. At higher pH values the product becomes more viscous until a point is reached at about pH 9.0 where a wholly undesirable mass is obtained.

This property of the liquid compositions appears to be related to the soy flour content thereof. For compositions of the present invention having a non-fat milk solids to soy flour ratio of about 9:1 slightly alkaline pH values are preferred. In one specific embodiment described hereinafter, pH 7.0 is specified for the liquid soy flour base prior to admixture with additional ingredients. For compositions having a higher proportion of soy flour, lower pH values are required to achieve a desirable viscosity. In a further specific embodiment hereof having a non-fat milk solids to soy flour ratio of 2:1, a pH of about 6.5–7.0 is specified.

One of the major advantages of the present process for the treatment of soy flour is that heat sterilization may be employed in the preparation of liquid products containing it in combination with skim milk. It has been observed that there is little or no tendency for liquid products containing from 2:1 to 9:1 parts by weight of non-fat milk solids, supplied principally by skim milk, per part by weight of soy flour treated according to the present process to curdle when heat sterilized. When untreated soy flour and raw or heat-stabilized skim milk are mixed and heat-sterilized, curdling invariably occurs, resulting in a product which is thoroughly unappetizing.

The so-called heat-stabilized skim milk is skim milk which has been heated within a period of about one minute to a temperature of 220° F. to 260° F. and then maintained at this temperature for a period of about 7 minutes at the 220° F. level or 1–2 minutes at the 260° F. level. Holding periods for other temperatures within the range are interpolated between these two figures. Heat stabilization has the effect of reducing the propensity of the skim milk to curdle when it is concentrated or sterilized by further treatment.

The following examples will illustrate the preparation of the compositions of the present invention in its various forms, including the novel process employed in their preparation.

EXAMPLE I (A) Commercial full fat soy flour (22.5% fat), 49 lbs., is added to 20 gal. of water at 120° F. with agitation to provide a homogeneous suspension. Sufficient ammonium hydroxide is added to the resulting suspension with stirring to raise the pH up to 8.2. The following ingredients are then added with agitation to provide again a homogeneous suspension.

| | |
|---|---|
| Potassium iodide _____ g__ | 0.157 |
| Corn oil _____ lbs__ | 11.5 |
| Coconut oil _____ lbs__ | 2.73 |
| Carrageenin (Kraystay S) _____ g__ | 57.5 |

The carrageenin is an emulsion stabilizer and is dispersed in the corn oil prior to adding to the mixture. The amounts of corn oil and coconut oil added are selected to bring the total fat content of the mixture (dry basis) up to about 39.9%.

The mixture is then heated by steam injection to maintain it at 190°–195° F. for 20 minutes in an open, well ventilated tank permitting efficient removal of the vapors. The slurry is then cooled to 120°–140° F. prior to further processing.

The cooled effluent is then homogenized under pressure at 2500 p.s.i.g. The homogenized product is spray-dried to provide a homogeneous powdered soy base having the following composition.

| | Percent |
|---|---|
| Full fat soy flour (22.5% fat) _____ | 77.3 |
| Corn oil _____ | 18.2 |
| Coconut oil _____ | 4.3 |
| Carrageenin _____ | 0.2 |
| Potassium iodide _____ | $5.5 \times 10^{-6}$ |

(B) The soy base is then used in the preparation of various nutritional compositions in powder form by dry blending. An illustration follows.

| | | |
|---|---|---|
| Nonfat milk solids (instant) _____ | lbs__ | 161.7 |
| Soy flour base (as above) _____ | lbs__ | 46.5 |
| Skim milk powder _____ _____ | lbs__ | 32.7 |
| Whole milk powder _____ | lbs__ | 22.3 |
| Sucrose _____ | lbs__ | 17.6 |
| Starch _____ | lbs__ | 12.1 |
| Yeast _____ | lbs__ | 3.00 |
| Vanilla flavor (solid) _____ | lbs__ | 2.64 |
| Vitamin concentrate [1] _____ | g__ | 476.00 |
| Mineral concentrate [2] _____ | g__ | 204.00 |

[1] Vitamin concentrate comprises:

| | G. |
|---|---|
| Pregelatinized starch _____ | 366.0 |
| Sodium ascorbate _____ | 67.5 |
| dl-α-Tocopheryl acetate _____ | 6.0 |
| Vitamin A palmitate (dispersion in dried gelatin beadlets 250,000 units-g.) _____ | 12.0 |
| Niacinamide _____ | 9.0 |
| Vitamin D (dispersion in dried gelatin beadlets 50,000 units-g.) _____ | 4.8 |
| Calcium pentothenate _____ | 6.0 |
| Pyridoxine HCl _____ | 1.46 |
| Thiamine HCl _____ | 1.35 |
| Riboflavin _____ | 1.8 |

[2] Mineral concentrate comprises:

| | |
|---|---|
| Pregelatinized starch _____ | 168.4 |
| Ferrous sulfate, exsiccated _____ | 30.2 |
| Manganese sulfate-$H_2O$ _____ | 3.7 |
| Cupric carbonate _____ | 1.7 |

After blending the above, the product is passed through an 8-mesh screen and packaged for sale to the consumer. In use, the dry product is reconstituted by mixing with water in a ratio of from about 28 to 36 fluid ounces of water per one-half pound of the dry composition, preferably about 1 quart per 1–2 pounds of the dry composition. The mixture may be blended with a mechanical stirrer or by hand.

EXAMPLE II (A) *Preparation of Liquid Soy Base*

Into a mixing vessel equipped with heater and agitator, containing 88 gallons of water heated to 150° F., are added the following ingredients, with agitation:

| | | |
|---|---|---|
| Full fat soy flour (22.5% fat) _____ | lbs__ | 100 |
| Corn oil _____ | lbs__ | 23.55 |
| Coconut oil _____ | lbs__ | 5.56 |
| Potassium iodide _____ | g__ | 0.32 |
| Carrageenin (Kraystay S) _____ | g__ | 117 |

The carrageenin is dispersed in the oil prior to adding the ingredients to the mixture. Concentrated (28%) aqueous ammonium hydroxide is added to raise the pH of the mixture to 8.2. After all of the ingredients are thoroughly mixed, the contents of the vessels are passed through a confined stream steam injection heater and heated by direct steam injection to 230° F. The holding time in the steam injection heater is from about 8 to 12 seconds. The contents of the steam injection heater are then passed into a vacuum chamber maintained at about 24 inches of vacuum, where flash evaporation occurs, reducing the temperature to 120°–135° F. The product is cooled to about 45° F. and passed to a holding tank. The pH of the flour slurry is 7.5 to 7.7 at this point. It is adjusted to pH 7 by the addition of hydrochloric acid. The resulting neutralized suspension has a solids content of 27.5%. It is used in the preparation of liquid nutritional compositions of the present invention as follows:

(B) *Production of Liquid Nutrient Product*

The following ingredients are blended in a mixing vessel equipped with an agitator and heater:

| | |
|---|---|
| Liquid skim milk concentrate (22% nonfat solids) lbs | 4808.4 |
| Liquid soy base (Ex. IIA) (27.5% total solids) lbs | 844.64 |
| Cream (40% butterfat) lbs | 75.17 |
| Calcium cyclamate lbs | 3.52 |
| Vanilla flavor lbs | 22.22 |
| Sucrose lbs | 119.31 |
| Carrageenin (Kraystay S) g | 600.0 |
| Mineral concentrate [1] g | 178.32 |
| Vitamin concentrate [2] g | 75.00 |

[1] Mineral concentrate:
Ferrous iron ---------weight percent--- 84.8755
Manganese ----------------------do---- 10.3634
Copper (basic) -----------------do---- 4.7611

[2] Vitamin concentrate:
Calciferol ----------------------------g-- 0.03
Vitamin A Palmitate -------------------g-- 8.3
Vitamin E ----------------------units-- 30.0
Corn oil, qs --------------------------g-- 75.0

The liquid skim milk is stabilized prior to mixing by heating in a steam injection heater to 250° F., held for 4 minutes and flashed to a holding chamber and permitted to cool to 150° F. The product is then concentrated to 22% solids by heating. The product preferably should have a solids content of from 20% to 25%.

The ingredients listed above are thoroughly blended at 150° F. and then homogenized by passing through a pressure homogenizer at 3000 p.s.i.g. The homogenized product is cooled to 50° F. in a holding tank. Dry vitamin mix of the following composition is added and incorporated by stirring:

DRY VITAMIN MIX

| | G. |
|---|---|
| Sodium ascorbate | 334.0 |
| Thiamine hydrochloride | 6.0 |
| Riboflavin | 9.0 |
| Niacinamide | 45.0 |
| Pyridoxine hydrochloride | 6.0 |
| Vitamin $B_{12}$ | 0.006 |
| Calcium pantothenate | 30.0 |

The solids content of the product is adjusted to 22% solids and placed in 8 ounce content steel cans and sealed. The cans are sterilized for 6 minutes at 250° F. The product may be chilled prior to consumption if desired, but when canned and sterilized as indicated it may be stored at room temperature.

The present invention also contemplates the production of puddings based upon the dry nutritional product heretofore described.

For example, the dry nutritional composition described in the foregoing and specifically illustrated in Example IB may be admixed with gelatinizing agents by conventional procedures to produce a pudding mix which may be readily converted to puddings, or utilized in the production of ice cream or frozen dessert. For example, alkali metal salts of alginic acid, such as sodium alginate, may be used in amounts of from 1.5 to 7% based on the dry solids weight of the nutrient composition with optimum amounts of about 3.5%. On the same basis carrageenin may be used in amounts of from 0.5% to 3.5%, rennet from 0.1% to 0.5%, gelatin from 3% to 12%, pectin (low methoxyl) from 2.5% to 10%, starch or pregelatinized starch from 7% to 26%. The gelatinizing agents other than alginic acids, carrageenin, and pregelatinized starch require heat in the preparation of the pudding. The alginates, carrageenins, and rennet have the feature that they have little or no caloric value in the amounts used, and thus do not appreciably change the caloric contents of the nutritional composition used in the preparation of the puddings. In the use of alginates and carrageenins as gelatinizing agents it is understood that it is conventional to add small amounts of edible salts to aid in sequestering of the calcium of the milk and/or participate in the setting reaction. Exemplary of such salts are, for alginates, disodium hydrogen phosphate, tetrasodium pyrophosphate, and hexametaphosphates; and for carrageenins, salts such as potassium citrate, potassium gluconate and sodium carbonate. Sweetners, such as saccharin and sodium cyclamate, are useful sweetening supplements, if desired.

The following examples will illustrate the preparation of such pudding materials:

EXAMPLE III (A) *Chocolate*

2 oz. nutritional product powder (½ cup) (Example IB)
1 level tablespoon breakfast cocoa
1 level teaspoon gelatin (plain)
1 teaspoon (5 ml.) liquid Sucaryl[1]
1¼ cups (10 oz.) water (B) *Vanilla*

2 oz. nutritional product powder (½ cup) (Example IB)
1 level teaspoon gelatin (plain)
¾ teaspoon (4 ml.) liquid Sucaryl[1]
1¼ cups (10 oz.) water

[1] Sucaryl sodium solution (sodium cyclamate).

EXAMPLE IV

An orange flavored nutritional powder of the present invention is prepared by blending the following ingredients in a suitable apparatus for 10 minutes or longer.

| | G. |
|---|---|
| Flavor, Orange | 47.63 |
| Vitamin premix [1] | 15.88 |
| Calcium cyclamate | 7.85 |
| Mineral premix (Example IB) | 6.80 |
| F D & C Yellow No. 6 | 3.31 |
| Sodium saccharin | 0.79 |
| F D & C Yellow No. 5 | 0.78 |

[1] Vitamin premix:
Vitamin A palmitate (dispersion in dried gelatin beadlets 250,000 units-g.) -----------g-- 0.40
Vitamin D (dispersion in dried gelatin beadlets 50,000 units-g.) ---------------------g-- 0.16
dl-α-Tocopheryl acetate --------------------g-- 0.20
Sodium ascorbate ---------------------------g-- 2.10
Thiamin hydrochloride ----------------------g-- 0.04
Riboflavin ---------------------------------g-- 0.06
Pyridoxine hydrochloride -----------------mcg-- 0.04
Vitamin $B_{12}$ ---------------------------g-- 40.0
Niacinamide --------------------------------g-- 0.30
Calcium pantothenate -----------------------g-- 0.20
Pregelatinized starch ----------------------g-- 14.48

This blend of flavors, dyes, vitamins, and minerals is then transferred to a large blender containing the following ingredients. These materials are then blended for 15 minutes.

| | | |
|---|---|---|
| Nonfat milk solids, instant | kg | 2.40 |
| Soy base (Example IA) | g | 701 |
| Nonfat milk solids | g | 496 |
| Powdered whole milk | g | 337 |
| Sucrose | g | 289 |
| Pregelatinized starch | g | 183 |
| Dried yeast | g | 45.4 |

The product is then removed from the blender, sifted through an 8 mesh sieve (U.S. Bureau of Standards sieve size) and stored in moisture proof drums. One-half pound of this powder when constituted with one quart of water will fulfill nutritional needs for an adult human being for one day and provide only 900 dietary calories.

EXAMPLE V

The following ingredients are placed in a mixing vessel equipped with a heater and agitator and containing 72 gallons of water heated to 150° F.: low fat soy flour (2.5% fat), 80 lbs.; corn oil, 38.55 lbs.; coconut oil, 10.56 lbs.; potassium iodide, 0.32 g.; Carrageenin (Kraystay S), 117 g. The carrageenin is dispersed in the oil prior to adding the ingredients to the mixture. Sufficient concentrated aqueous ammonium hydroxide (28%) is then added to raise the pH thereof to 10.0. After all the ingredients are thoroughly mixed, the contents of the vessel are passed through a confined stream steam injection heater and heated by direct steam injection to 240° F. Holding time in the heater is about 2 to 5 seconds. The effluent stream is then passed into a vacuum chamber maintained at a vacuum of 24 inches where flash evaporation of a portion of the water occurs. Evaporation cools the temperature of the stream to about 140° F. The effluent stream is then suitable for spray-drying to provide the dry powdered soy base suitable for use in the preparation of powdered compositions as described in Example I. Alternatively, it may be neutralized to pH 7.0, concentrated to a solids content of about 27%, and used in the preparation of liquid compositions as described in Example II.

EXAMPLE VI

The process of Example IA for the preparation of a powdered soy base is conducted by neutralization to pH 7.5 with concentrated aqueous ammonium hydroxide rather than pH 8.2 as specified in Example I. Processing can be conducted in exactly the same fashion since the consistency of the suspension is not substantially different from that obtained at pH 8.2. An acceptable product is obtained which is somewhat less desirable than that obtained in Example IA since compositions prepared from it, as described in Example IB, have a somewhat sandy or mealy mouth feel as compared to the product of Example IB. The water suspendibilty of nutritional compositions prepared from this soy base is satisfactory but nevertheless somewhat inferior to that of the product of Example I.

EXAMPLE VII

A liquid soy base is prepared as described in Example II with the modification that the slurry is adjusted to pH 8.2 with gaseous ammonia admitted from a cylinder of anhydrous ammonia. The gas is simply admitted through a tube below the surface of the slurry while it is being stirred, the preparation being conducted at room temperature prior to this stage rather than at 150° F. Further processing is conducted in identical fashion with identical results.

EXAMPLE VIII

The following example illustrates the preparation of a liquid nutritional composition in accordance with one embodiment of the present invention but which is not intended as the exclusive diet in a weight-losing routine as are the compositions of the preceding examples, but rather as a ready-prepared meal adapted to consumption under almost any circumstances, such as in emergencies. It is also designed as a dietary supplement for use in building up debilitated or underweight subjects. This product differs primarily in having a higher proportion of protein provided by soy flour and a lower proportion of unsaturated fats. It is thus a very nutritious product but one which may not be adapted as the sole diet for long term use. The product is, however, found by some subjects to be more palatable. For these reasons it is better adapted for weight-gaining or rehabilitatiing type of diets. It is preferably packaged in 12-oz. containers, supplying on ingestion approximately 400 dietary calories per unit.

(A) Liquid Soy Base

Ten gallons of water are warmed to 130° F. in a tank equipped with an efficient agitator and 15.3 lbs. of full fat soy flour are added thereto. The pH is then adjusted to 8.2 with concentrated aqueous ammonium hydroxide (28%), approximately 2.5 ml. being required. The mixture is then passed through a heat exchanger adapted for continuous operation, and heated to 240° F. by direct steam injection. The fluid flow is passed directly to an evacuated tank maintained at 24 inches of vacuum, approximately 2 seconds at the 240° F. temperature having elapsed. The fluid effluent is then cooled to 50° F. and adjusted to pH 6.7 with 1 N hydrochloric acid, approximately 10.2 ml. being required.

(B) Heat-Stabilized Skim Milk Concentrate

Approximately 140 lbs. of fluid skim milk are rapidly heated to 250° F. in an efficient heat exchanger and maintained at this temperature for four minutes. It is then concentrated in vacuo to a solids content of 22%. The product analyzes 0.2% fat. A portion of this skim milk concentrate is then mixed with 21.1 lbs. of cream (6% nonfat solids, 40% fat) to provide 134 lbs. of standardized skim milk concentrate.

(C) Liquid Blending

The standardized skim milk concentrate, 134 lbs., is heated to 180° F. and transferred to a mix tank where the following ingredients are added:

| Ingredient | Unit | Amount |
|---|---|---|
| Liquid soy base (Example IXA) dry basis | lbs | 14.7 |
| Sucrose | lbs | 20.4 |
| Dextri-maltose [1] | lbs | 5.1 |
| Carrageenin (Kraystay S) | g | 24.8 |
| Vanilla flavor | g | 133.6 |
| Sodium chloride | g | 26.0 |
| Sodium iodide | mg | 14 |
| Mineral premix [2] | g | 7.28 |
| Vitamin A, D and E concentrates [3] | g | 2.86 |
| Starch | g | 125.0 |
| Sodium alginate | g | 12.4 |
| Cocoa | g | 1.84 |

[1] Maltose and dextrins derived from enzymic action of barley malt on corn flour.

[2] Mineral premix:

| | Percent composition, w.-w. |
|---|---|
| Ferrous sulfate, exsiccated | 84.8755 |
| Manganese sulfate, monohydrate | 10.3634 |
| Cupric carbonate (basic) | 4.7611 |

[3] Vitamin A, D and E concentrate:

| | |
|---|---|
| Calciferol in corn oil | 2.14 |
| Vitamin A palmitate | 18.75 |
| dl-α-Tocopheryl acetate | 29.11 |
| Corn oil | 50.00 |

The above ingredients are thoroughly blended and analyzed for total solids, percent protein, and percent fat. The protein analysis is calculated by multiplying the amino nitrogen analysis by the factor 6.25. Hot water is then added to the batch to adjust the total solids, percent protein and percent fat to the following values: 23.41% total solids, 3.50% fat, 5.25% protein. The preparation is then homogenized at a pressure of 2500 p.s.i.g., cooled to 50° F., and the following vitamin premix added thereto and thoroughly blended.

DRY VITAMIN PREMIX

| | Percent composition, w.-w. |
|---|---|
| Thiamin hydrochloride | 0.114 |
| Niacinamide | 2.825 |
| Calcium pantothenate | 0.386 |
| Pyridoxine hydrochloride | 0.091 |
| Vitamin $B_{12}$ (diluted 1:1000 (w.-w.) with dicalcium phosphate) | 0.051 |
| Sodium ascorbate | 96.533 |

The preparation is then filled into conventional tin plated steel cans, 12 oz. per can, and the cans sterilized for 8 minutes at 250° F.

EXAMPLE IX

A vanilla flavored preparation analogous to that of Example VIII is prepared in the same fashion using the following amounts of ingredients:

| | | |
|---|---|---|
| Standardized skim milk concentrate | lbs | 138 |
| Liquid soy base (Example IXA) dry basis | lbs | 14.7 |
| Sucrose | lbs | 20.8 |
| Dextri-maltose | lbs | 5.2 |
| Carrageenin (Kraystay S) | g | 31.3 |
| Vanilla flavor | lbs | 1.18 |
| Sodium chloride | g | 26.0 |
| Sodium iodide | mg | 14 |
| Mineral premix | g | 7.28 |
| Vitamin A, D and E concentrate | g | 2.86 |
| Vitamin premix (dry) | g | 73.3 |

EXAMPLE X

The powdered homogeneous soy base of Example IA is prepared from defatted soy flour (less than 0.5% fat) in the following fashion. Commercial defatted soy flour, 38 lbs., is added to 20 gal. of water at 120° F. with agitation to provide a homogeneous suspension. The suspension is then adjusted to pH 8.2 with concentrated aqueous ammonium hydroxide. The following ingredients are then added with agitation to provide a homogeneous suspension:

| | | |
|---|---|---|
| Potassium iodide | g | 0.157 |
| Corn oil | lbs | 19.5 |
| Coconut oil | lbs | 5.73 |
| Carrageenin (Kraystay S) | g | 57.5 |

The mixture is then processed as described in Example I to provide a homogeneous powdered soy base containing the same proportion of fat as that described in Example IA.

EXAMPLE XI

The process of Example IA for the preparation of a powdered homogeneous soy base is repeated substituting monomethylamine for aqueous ammonium hydroxide in pH adjustment. The monomethylamine is admitted through a gas inlet tube attached to a cylinder of the compressed gas. Essentially identical results are obtained.

The foregoing compositions of the present invention in the various forms illustrated are useful in providing a complete balanced diet of limited caloric intake sufficient to maintain adequate nutritional standards.

The compositions may be utilized as a complete food to provide a caloric intake of approximately 900 calories per day, or may be utilized in conjunction with regular standard diets in one or more meals per day. Use of the compositions of the present invention on a regular basis has resulted in substantial loss of weight in human patients over a period of use. It has been found that the health of the patients, using the compositions of the present invention as a complete diet or as a supplement to regular foods, has been maintained at a satisfactory standpoint from a medical viewpoint for a period of more than one year, and that successful weight reduction has been accomplished when taken in accordance with a regular established regimen without the undesirable side effects which are produced by various weight-reducing drugs or by the use of starvation or nutritionally unbalanced diets.

The present compositions also have an unusually high satiety value so as to enable an obese individual to ingest it as the sole diet in a weight reduction program, but without the concomitant hunger pangs that so frequently ensue when caloric intake is reduced.

While several specific embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A nutritional composition comprising, on a dry weight basis, milk solids and containing from 52% to 81% nonfat milk solids, from 1% to 4% milk fat, from 6% to 18% soy flour and from 4% to 12% of a sugar selected from the group consisting of sucrose, maltose, dextrose and fructose.

2. A vitamin and mineral fortified nutritional composition comprising on a dry weight basis milk solids and containing from 52% to 81% nonfat milk solids, from 1% to 4% milk fat, from 6% to 18% full fat soy flour and from 4% to 12% of a sugar selected from the group consisting of sucrose, maltose, dextrose and fructose, said composition being further characterized in that it contains from 25% to 35% protein, from 5% to 13% fat and from 40% to 60% carbohydrates.

3. The composition of claim 2 wherein the fat component contains from 50% to 70% unsaturated fats and from 30% to 50% saturated fats.

4. A vitamin and mineral fortified dietary nutritional composition comprising on a dry weight basis milk solids and containing from 58% to 75% nonfat milk solids, from 1.5% to 2.5% milk fat, from 9% to 13% soy flour and from 5% to 9% of a sugar selected from the group consisting of sucrose, maltose, dextrose and fructose.

5. The composition of claim 4 containing from 29% to 33% protein, from 8% to 10% fat and from 40% to 60% carbohydrate.

6. The composition of claim 5 wherein the fat component contains from 50% to 70% unsaturated fats and from 30% to 50% saturated fats.

7. The composition of claim 4 wherein the sodium content is between about 0.3% and 0.5% on a dry weight basis.

8. A nutritional composition comprising, on a dry weight basis, milk solids and containing from 52% to 81% nonfat milk solids, from 1% to 4% milk fat, from 6% to 18% soy flour and from 4% to 12% sucrose.

9. A vitamin and mineral fortified nutritional composition comprising on a dry weight basis milk solids and containing from 52% to 81% nonfat milk solids, from 1% to 4% milk fat, from 6% to 18% full fat soy flour and from 4% to 12% sucrose, said composition being further characterized in that it contains from 25% to 35% protein, from 5% to 13% fat and from 40% to 60% carbohydrates.

10. The composition of claim 9 wherein the fat component contains from 50% to 70% unsaturated fats and from 30% to 50% saturated fats.

11. A vitamin and mineral fortified dietary nutritional composition comprising on a dry weight basis milk solids and containing from 58% to 75% nonfat milk solids, from 1.5% to 2.5% milk fat, from 9% to 13% soy flour and from 5% to 9% sucrose.

12. The composition of claim 11 containing from 29% to 33% protein, from 8% to 19% fat and from 40% to 60% carbohydrate.

13. A vitamin and mineral fortified nutritional product comprising milk solids and containing from 52% to 81% nonfat milk solids, from 1% to 4% milk fat, from 6% to 18% soy flour and from 4% to 12% sucrose, said composition being further characterized as containing from 25% to 35% protein, from 5% to 13% fat and from 40% to 60% carbohydrate, said proportions being on a dry weight basis.

14. The composition of claim 13, wherein the fat component contains from 50% to 70% unsaturated fats and from 30% to 50% saturated fats.

15. A vitamin and mineral fortified nutritional product comprising milk solids and containing from 58% to 75% nonfat milk solids, from 1.5% to 2.5% milk fat, from 9% to 13% full fat soy flour and from 5% to 9% of a sugar selected from the group consisting of sucrose, maltose, dextrose, and fructose, said composition being further characterized as containing from 29% to 33% protein, from 40% to 60% carbohydrate, and from 8% to 19% fat, said fat component containing from 50% to 70% unsaturated fats and from 30% to 50% saturated fats, said proportions being on a dry weight basis.

16. A vitamin and mineral fortified nutritional product comprising milk solids and containing from 58% to 75% nonfat milk solids from 1.5% to 2.5% milk fat, from 9% to 13% full fat soy flour and from 5% to 9% sucrose, said composition being further characterized as containing from 29% to 33% protein, from 40% to 60% carbohydrate, and from 8% to 10% fat, said fat component containing from 50% to 70% unsaturated fats and from 30% to 50% saturated fats, said proportions being on a dry weight basis.

17. A vitamin and mineral fortified dietary nutritional composition containing on a dry weight basis from 50% to 75% nonfat milk solids, from 3% to 10% whole milk solids, from 6% to 18% precooked soy flour and from 4% to 12% sucrose, said composition being further characterized as containing from 25% to 35% protein, from 5% to 13% fat and from 40% to 60% carbohydrate, and wherein said fat component contains from 50% to 70% unsaturated fats and from 30% to 50% saturated fats.

18. The composition of claim 17 wherein the caloric content is from 700 to 1200 calories per one-half pound (dry basis).

19. The composition of claim 17 wherein the sodium content is from about 0.3% to about 0.5% on a dry weight basis.

20. A liquid vitamin and mineral fortified nutritional composition containing on a dry weight basis from 52% to 81% nonfat milk solids, from 1% to 4% milk fat, from 6% to 18% full fat precooked soy flour, from 4% to 12% sucrose, and water.

21. The composition of claim 20 containing from 25% to 35% protein, from 5% to 13% fat and from 40% to 60% carbohydrate and wherein the fat component contains from 50% to 70% unsaturated fats and from 30% to 50% saturated fats.

22. A liquid vitamin and mineral fortified nutritional composition containing on a dry weight basis from 58% to 75% nonfat milk solids, from 1.5% to 2.5% milk fat, from 9% to 13% full fat precooked soy flour, from 5% to 9% sucrose and water.

23. The composition of claim 22 containing from 29% to 33% protein, from 8% to 10% fat and from 40% to 60% carbohydrate, and wherein said fat component contains from 50% to 70% unsaturated fats and from 30% to 50% saturated fats.

24. A vitamin and mineral fortified nutritional pudding mix composition comprising a gelatinizing agent and milk solids and containing from 52% to 81% nonfat milk solids, from 1% to 4% milk fat, from 4% to 12% of a sugar selected from the group consisting of sucrose, maltose, dextrose and fructose, and from 4% to 18% full fat soy flour, said composition being further characterized as containing from 25% to 35% protein, from 5% to 13% fat and from 40% to 60% carbohydrate, said proportions all being on a dry weight basis.

25. A dry vitamin and mineral fortified nutritional pudding mix composition comprising a gelatinizing agent selected from the group consisting of alginates, carrageenins, rennet, gelatin, pectin, and starch, and milk solids and containing 52% to 81% nonfat milk solids, from 1% to 4% milk fat, from 4% to 12% sucrose, and from 6% to 18% soy flour, said composition being further characterized as containing from 25% to 35% protein, from 5% to 13% fat and from 40% to 60% carbohydrate, said proportions all being on a dry weight basis.

26. A vitamin and mineral fortified nutritional dietary pudding mix composition comprising a gelatinizing agent and milk solids and containing from 52% to 81% nonfat milk solids, from 1% to 4% milk fat, from 6% to 18% soy flour and from 4% to 12% sucrose, said composition being further characterized as containing from 25% to 35% protein, from 40% to 60% carbohydrate and from 5% to 13% fat, said proportions being on a dry weight basis.

27. The composition of claim 26 wherein the fat component contains from 50% to 70% unsaturated fats and from 30% to 50% saturated fats.

28. A process for the preparation of a nutritional composition adapted for human consumption of improved palatability and dispersibility and containing soy flour as a significant protein ingredient which comprises the steps of heating a mixture containing one part by weight of soy flour and from 3 to 7.5 parts by weight of water and having a pH between about 7.5 and about 10.0 to a temperature of between about 190° F. and 240° F. for a period of between 2 seconds and 20 minutes.

29. A process for the preparation of a nutritional composition adapted for human consumption and containing soy flour as a significant protein ingredient comprising the steps of agitating one part by weight soy flour and from 3 to 7.5 parts by weight of water sufficiently to form a homogeneous suspension, adjusting the pH of said suspension to within the range of 7.5 to 10, heating and agitating resulting suspension at 190° F. to 240° F. for a graded time interval of from 2 seconds to 20 minutes.

30. A process for the preparation of a nutritional composition adapted for human consumption and containing soy flour as a significant protein ingredient comprising the steps of agitating one part by weight soy flour and from 3 to 7.5 parts by weight of water sufficiently to form a homogeneous suspension, adjusting the pH of said suspension to within the range of 7.5 to 10, heating and agitating resulting suspension at 190° F. to 240° F. for a graded time interval of from 2 seconds to 20 minutes under such conditions of temperature and pressure as to result in the evaporation of an amount of water equal to at least 1% the weight of water used in preparation of said suspension.

31. The process of claim 30 wherein the pH of said suspension is adjusted with a volatile, non-toxic base.

32. The process of claim 30 wherein the pH of said suspension is adjusted with aqueous ammonium hydroxide.

33. The process of claim 30 wherein the pH of said suspension is adjusted with gaseous ammonia.

34. The process of claim 30 wherein the pH of said suspension is adjusted to within the range 8.0 to 9.0.

35. The process of claim 30 wherein the pH of said suspension is adjusted to 8.2.

36. The process of claim 30 wherein said suspension is heated and agitated at atmospheric pressure.

37. The process of claim 30 wherein said suspension after pH adjustment is raised to a temperature of about 190° F. to 240° F. by application of a heat source thereto, said heat source is thereupon removed, and the pressure on said suspension precipitously reduced, resulting in evaporation of sufficient water from said suspension to reduce the temperature thereof to within the range of about 120° F. to 135° F.

38. The process which comprises forming a homogeneous suspension of 3.7 parts by weight of water, 1 part by weight of soy flour, and sufficient edible fatty triglyceride to adjust fat content of said mixture to about 40% to 50% on a dry weight basis, adjusting said suspension to pH 8.2 by treatment with aqueous ammonium hydroxide, injecting sufficient steam into said suspension to raise the temperature thereof to 240° F. within a period of up to 5 seconds, maintaining said temperature for 8 to 12 seconds, precipitously reducing the pressure on said heated suspension sufficiently to result in near instantaneous evaporation of sufficient of the volatile constituents thereof to cool remaining suspension to a temperature of 120° F. to 135° F.

39. A vitamin and mineral fortified nutritional composition having on a dry weight basis a caloric content of from 700 to 1200 calories per one-half pound and comprising on a dry weight basis from 52% to 81% nonfat milk solids, from 1% to 4% milk fat, from 6% to 18% of alkaline-precooked soy flour and from 4% to 12% of a sugar selected from the group consisting of sucrose, maltose, dextrose, fructose and mixtures thereof, said composition being further characterized in that it contains on a dry weight basis from 25% to 35% total protein, from 5% to 13% total fat and from 40% to 60% total carbohydrates.

40. A vitamin and mineral fortified dietary nutritional composition containing on a dry weight basis from 50% to 75% nonfat milk solids, from 3% to 10% whole milk solids, from 6% to 18% soy flour, and from 4% to 12% of a sugar selected from the group consisting of sucrose, maltose, dextrose and fructose, said composition being further characterized as containing on a dry weight basis from 25% to 35% total protein, from 5% to 13% total fat and from 40% to 60% total carbohydrate.

References Cited in the file of this patent

UNITED STATES PATENTS

| | | |
|---|---|---|
| 551,134 | Morfit | Dec. 10, 1895 |
| 987,849 | Block | Mar. 28, 1911 |
| 1,314,298 | Yamamoto | Aug. 26, 1919 |
| 2,135,591 | Moulton | Nov. 8, 1938 |
| 2,282,789 | Musher | May 12, 1942 |
| 2,627,465 | Pettibone | Feb. 3, 1953 |
| 2,933,392 | Jacono et al. | Apr. 19, 1960 |

OTHER REFERENCES

Gravioto et al.: Chemical Abstracts, vol. 45, 1951, 9637F.

Shurpalekar et al.: Annals of Biochemistry and Experimental Medicine, Calcutta, vol. 19, 1959, pp. 269–274.

Barkley, "Soybean and Soybean Products," vol. II, 1951, Interscience Publ. Inc., N.Y., pp. 773–8, 954, 955, 974. (Copy in Div. 63.)

Modern Drugs, March 1960, p. 1361. (Copy in Div. 43.)

UNITED STATES PATENT OFFICE
CERTIFICATE OF CORRECTION

Patent No. 3,097,947                      July 16, 1963

Kenneth Stanley Kemmerer

It is hereby certified that error appears in the above numbered patent requiring correction and that the said Letters Patent should read as corrected below.

Column 2, line 11, for "12" read -- 12% --; column 7, line 28, for "10,3634" read -- 10.3634 --; line 29, for "4,7611" read -- 4.7611 --; column 8, line 17, for "Sweetners" read -- Sweeteners --; column 12, line 59, and column 13, line 5, for "19%", each occurrence, read -- 10% --; column 13, line 10, after "solids" insert a comma; column 16, line 10, for "Jacono et al." read -- Iacono et al. --; line 18, for "Barkley" read -- Markley --.

Signed and sealed this 7th day of January 1964.

(SEAL)

Attest:

ERNEST W. SWIDER

Attesting Officer

EDWIN L. REYNOLDS

Acting Commissioner of Patents